(No Model.)
R. T. FITZGERALD.
TOBACCO STICK.
No. 439,498.      Patented Oct. 28, 1890.
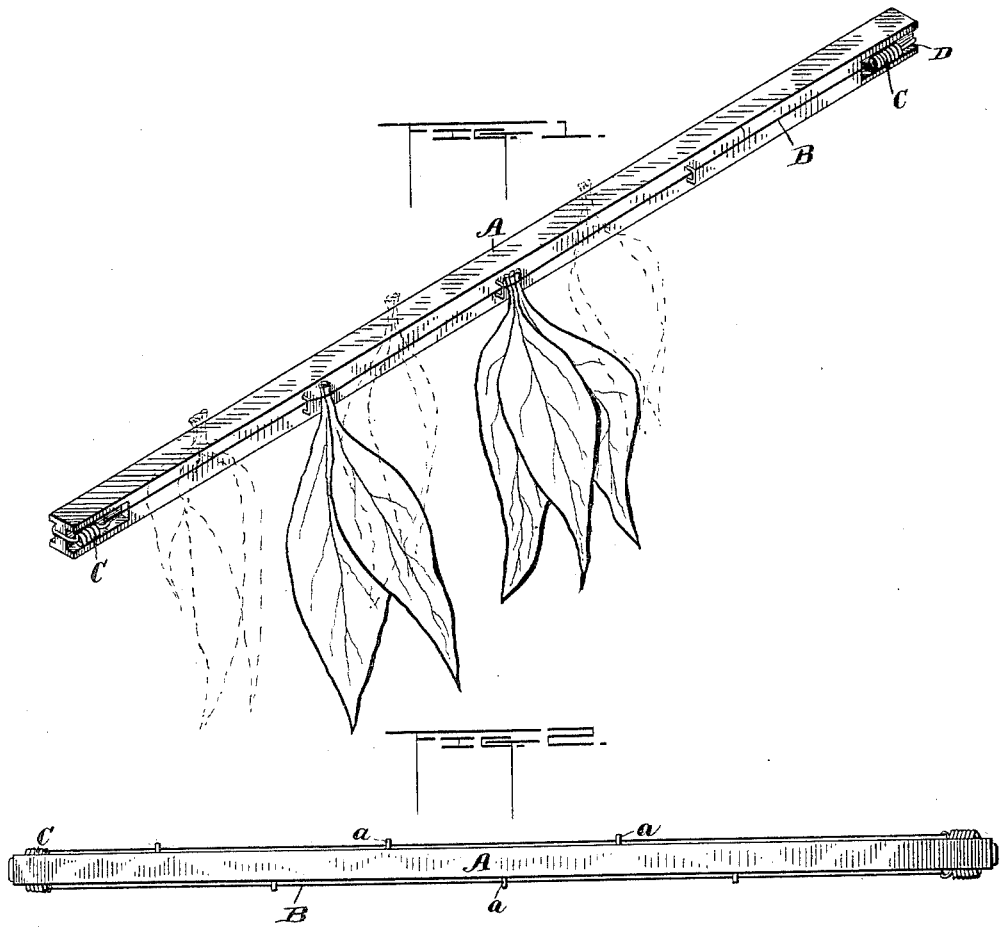
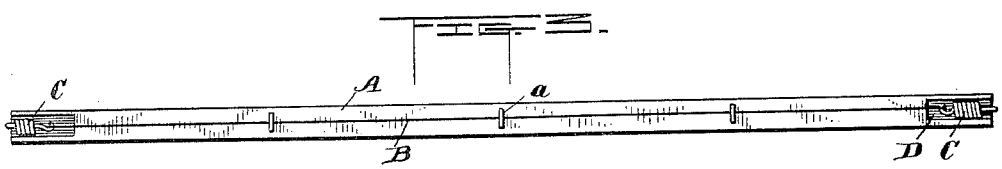
WITNESSES
R. B. Seward
R. M. Emmatt
INVENTOR
Richard T. Fitzgerald
By his Attorney
George G. Schroeder

UNITED STATES PATENT OFFICE.

RICHARD THOMAS FITZGERALD, OF RUFFIN, NORTH CAROLINA.

TOBACCO-STICK.

SPECIFICATION forming part of Letters Patent No. 439,498, dated October 28, 1890.

Application filed March 22, 1890. Serial No. 344,879. (No model.)

*To all whom it may concern:*

Be it known that I, RICHARD THOMAS FITZGERALD, a citizen of the United States, residing at Ruffin, in the county of Rockingham and State of North Carolina, have invented certain new and useful Improvements in Tobacco-Sticks; and I do hereby declare the following to be a full, clear, and exact description of the invention, such as will enable others skilled in the art to which it appertains to make and use the same.

My invention relates to certain new and useful improvements in tobacco-sticks.

The object of the invention is to obtain an article of the character described which will afford a rapid, convenient, and effective means of saving tobacco-leaves and holding them while curing, which will be simple in construction and which can be made at a low cost.

To the accomplishment of the above the invention consists in certain novel parts and combination of parts, as will be hereinafter fully described and specifically claimed, reference being had to the accompanying drawings, in which—

Figure 1 represents a perspective of my device, showing the manner in which the tobacco-leaves are held in the stick. Fig. 2 is a top plan view of the stick, and Fig. 3 is a side view of the same.

In the drawings, A represents the body portion of the stick, which is of suitable length, preferably from four to five feet, although it may be made of any convenient length and of any suitable size. On opposite sides of this piece A and separated from each other a short distance I provide guides $a\ a$, which, as shown in the drawings, preferably consist of small staples secured in the stick, although rings or any suitable form of guide may be used. These guides are so arranged on opposite sides of the stick as to alternate and not be placed at points opposite each other, the object of these guides being to keep the cord hereinafter described in close proximity to the stick.

A cord or small wire B is passed through these staples, as shown in the drawings, and secured at the ends to suitable springs C, which are removably secured to the stick or body piece A. In the drawings I have shown the stick as provided with a spring at each end; but if it is desired but one spring may be used, the cord in such case being secured at one end to the spring and at the other end to the stick in any suitable manner. It will be understood that instead of the coiled spring, which I have shown in the drawings as being secured to the end of the stick and partly seated in small grooves or channels D, that any suitable form of spring may be used.

The manner of using the device is as follows: The sticks are taken to the field or other place where they are to be used, the operator holding one of them with one hand, while with the other he raises the cord B between the staples. The leaves are then placed with their stems or butts between the cord and the stick, and the cord is released from the hand, the tension of the springs holding the leaves securely in position, as shown in Fig. 1. This is continued until the stick becomes filled, when it may be removed to any desired place and hung up or placed in any suitable position for curing. The stick may also be used for holding bundles of tobacco-leaves which have already been cured. When it is desired to release the leaves, the spring is detached from the stick at one end, thus releasing the tension of the cord and permitting the leaves to fall out.

It will be seen that by the use of a device constructed as above described, a rapid and convenient means is obtained for saving tobacco-leaves and supporting them in a suitable position for curing and from which they may be easily released.

Having thus described my invention, what I claim as new therein, and that for which I desire to secure Letters Patent, is—

1. The herein-described tobacco-stick, consisting, essentially, of an elongated body portion, a spring or springs mounted on the ends of such portion, guides secured to the body portion intermediate of such springs, and cords connecting the springs and passing through the guides, substantially as described.

2. The herein-described tobacco-stick, consisting, essentially, of an elongated body portion, a spring or springs mounted on the ends of such portion, guides secured to said portion on opposite sides thereof and placed alternate of each other, and cords passing through such guides and connecting the springs, substantially as described.

In testimony whereof I affix my signature in presence of two witnesses.

RICHARD THOMAS FITZGERALD.

Witnesses:
W. H. WARINER,
J. A. BENTON.